United States Patent Office 3,206,519
Patented Sept. 14, 1965

3,206,519
PREPARATION OF ALKYL AROMATIC HYDROCARBONS
Gert G. Eberhardt, Philadelphia, Pa., assignor to Sun Oil Company, Philadelphia, Pa., a corporation of New Jersey
No Drawing. Filed Nov. 19, 1963, Ser. No. 324,871
29 Claims. (Cl. 260—671)

This application is a continuation-in-part of my copending application Serial No. 202,678, filed June 15 1962, now abandoned.

This invention relates to the preparation of alkyl aromatic hydrocarbons by the reaction of ethylene with aromatics of lower molecular weight and to the novel catalyst system used to effect the reaction. The catalyst causes a telomerization reaction to occur which can yield alkyl aromatics in which the alkyl groups have either no branching or branching only at the alpha carbon atom. The invention is particularly useful for producing straight chain alkyl benzenes that are useful as intermediates in the preparation of detergents of the alkyl benzene sulfonate type.

It is known that organo-alkali metal compounds will function as a catalyst for alkylating with ethylene alkyl aromatic hydrocarbons that have one or more hydrogen atoms attached to the alpha carbon atom of the alkyl group. For example, ethylene can be caused to alkylate toluene at the methyl group by using benzzyl sodium as catalyst. The scope of the reaction is limited to the addition of one ethylene molecule for each hydrogen atom position of the methyl group and does not include telomerization whereby chain propagation would be effected. Thus the only products that can be obtained with this type of catalyst from toluene and ethylene are n-propylbenzene, 3-phenylpentane and t-heptylbenzene. This type of reaction has been disclosed in Closson et al. United States Patent No. 2,728,802.

It has also been disclosed in the prior art that metallic lithium at sufficiently elevated temperature will cause ethylene to react with an alkyl aromatic such as toluene and that in this case some amount of telomerization or chain growth can be effected to yield 1-phenylalkanes in which the alkyl groups are unbranched. This type of reaction has been described in Fotis United States Patent No. 2,984,691. However, a relatively high temperature such as 250° C. is required and even at this temperature level the reaction is slow. The reaction will take place only for aromatic hydrocarbons which have an alkyl substituent that contains a hydrogen atom at the alpha carbon atom. Furthermore undesirable tarry material is produced as a by-product of the reaction. Consequently this procedure is not a desirable way of producing straight chain alkyl benzenes.

The present invention provides an improved procedure for telomerizing ethylene with aromatic hydrocarbons whereby alkyl aromatics can be produced which have an unbranched alkyl chain or a chain having a single branch at the alpha carbon atom. I have now discovered that the combination of a hydrocarbolithium compound with a non-aromatic tertiary amine provides a highly effective catalyst for promoting this type of reaction. The reaction will take place not only with alkyl aromatic hydrocarbons that have one or more hydrogen atoms positioned at the alpha carbon atom, such as toluene or propyl benzene, but also with aromatics which do not contain such hydrogen atoms such as benzene or t-butylbenzene.

According to the invention ethylene is reacted with a benzenoid hydrocarbon by contacting ethylene with the hydrocarbon at a temperature in the range of 50–180° C. in the presence of a catalyst system which is a combination of a non-aromatic tertiary amine with LiR wherein R is a hydrocarbon radical having 1–30 carbon atoms selected rfom the group consisting of alkyl, cycloalkyl, alkenyl, phenyl, alkylphenyl and phenylalkyl. If the starting aromatic contains a saturated hydrocarbon group having primary or secondary hydrogen atoms attached to the alpha carbon atom, reaction will take place mainly at the position of such hydrogen atom and chain growth from the alpha carbon atom will occur by telomerization. When the starting aromatic has no hydrogen on an alpha carbon atom, reaction at the aromatic nucleus and growth therefrom will take place.

In a further embodiment of the invention the catalyst system used is obtained by combining a non-aromatic tertiary amine with both LiR and NaR'. In this case both R and R' are hydrocarbon radicals having 1–30 carbon atoms selected from the group consisting of alkyl, cycloalkyl, alkenyl, phenyl, alkylphenyl and phenylalkyl. R and R' can be the same or different radicals of the class specified. The amounts of the sodium and lithium compounds used are such that the NaR' to LiR molar ratio is in the range of 0.01:1 to 5:1. The effect of including the organo-sodium component in the catalyst is to reduce the chain length resulting from the telomerization reaction and thus yield alkyl aromatics of lower average molecular weight than otherwise would be obtained under equivalent conditions.

Examples of applications of the invention are the reaction of ethylene with benzene to produce mainly straight chain alkyl aromatics having even numbers of carbon atoms in the side chains and the reaction of ethylene with toluene to produce mainly straight chain alkyl aromatics in which the side chains have uneven numbers of carbon atoms. Any other benzenoid hydrocarbon which has either an unsubstituted carbon atom in the ring or one or more saturated hydrocarbon substituents in which a hydrogen atom is attached to the alpha carbon atom can be used as starting material. The aromatics usually employed as feed are benzene, monoalkylbenzenes and dialkylbenzenes. The following are a few examples of other specific aromatics that can be used as feed to the present process: xylenes, ethylbenzene, n-propylbenzene, i-propylbenzene, the trimethylbenzenees, normal, secondary and tertiary butylbenzenes, tetralin, cyclohexylbenzene, and the like.

The catalyst system for practicing the present process can be pre-formed and then added to the aromatic hydrocarbon to be reacted or can be prepared in situ by adding the catalyst components to the aromatic to be reacted. As previously indicated, the essential ingredients of the catalyst are a hydrocarbo-lithium compound having 1–30 carbon atoms and a non-aromatic tertiary amine. These components when admixed form coordination compounds which are the active catalyst species. The R group of the lithium compound can be any hydrocarbon radical of the specified number of carbon atoms selected from the group consisting of alkyl, cycloalkyl, alkenyl, phenyl, alkylphenyl and phenylalkyl. The following are examples of suitable R groups for the LiR component: ethyl, propyl, isopropyl, n-butyl, isobutyl, tertiary butyl, n-amyl, isoamyl, n- or isooctyl, n- or isodecyl, lauryl, cyclopentyl, methylcyclohexyl, phenyl, benzyl, tolyl, xlyl, cumyl, methylbenzyl, propylbenzyl, 2-phenylethyl, allyl, crotonyl and the like. Preferably LiR is an alkyl lithium in which the alkyl group has a 2–10 carbon atoms.

The amine component of the catalyst system can be any tertiary amine which is non-aromatic, including polyamines as well as monoamines. While any such amine will, in combination with the hydrocarbo-lithium component, form a catalyst system that is effective for telomerizing ethylene with benzenoid hydrocarbons, certain types of amines produce the most active catalysts and hence are preferred. Best results generally are obtained with chelating diamines, i.e., diamines in which the two nitrogen atoms are so spaced in the molecule that the diamine can form a chelate with the lithium component of the catalyst. These chelating amines can be of either of two sub-types depending upon whether the molecular structure is flexible or rigid. Examples of the flexible sub-type are as follows: N,N'-tetramethylethylene diamine and N,N'-tetrapropylethylene diamine. The following are examples of the rigid sub-type in which the nitrogen atoms are so positioned with respect to each other that metal chelates can readily be formed in spite of the lack of flexibility in the molecular structure:

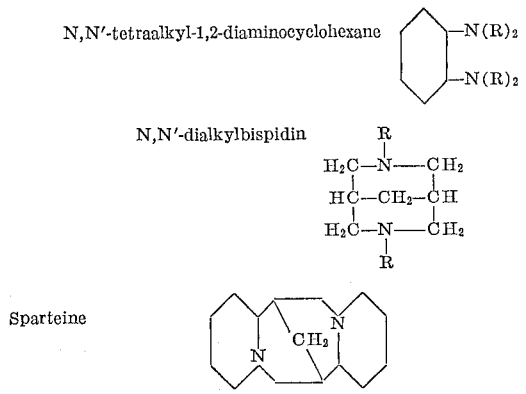

Chelates formed from the LiR component and diamines of the latter sub-type have particualrly good stability and high catalytic activity.

Another preferred type of amine for use in practicing the invention comprises amines in which one or more of the nitrogen atoms are at a bridgehead position, by which is meant that all three valences of the nitrogen participate in ring systems. The preferred amine of this type is triethylene diamine, which also can be designated 1,4-diaza[2.2.2]bicyclooctane, which has the following structure:

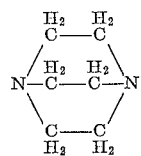

These bridgehead type amines are non-chelating but nevertheless form coordination complexes with the LiR component that have good catalytic activity and stability. Another amine of the bridgehead type is quinuclidine or 1,4-ethylenepiperidine, which has a structure like the foregoing except that one of the nitrogen atoms is replaced by a CH group. Still other examples are the aza-adamantanes which structurally resemble adamantane except that one or more nitrogen atoms are substituted at bridgehead positions in place of carbon.

Non-aromatic tertiary amines other than the chelating and bridgehead types discussed above also can be used in practicing the invention although they generally produce catalysts which have lower activity and stability and hence are not preferred. Examples of such other tertiary amines that can be used are trimethylamine, triethylamine, triisobutylamine, tridecylamine, trilaurylamine, N,N'-tetramethylhexamethylene diamine, N,N'-dimethylpiperazine, N-methylpiperidine, N-ethylpyrrolidine and the like.

The proportion of the tertiary amine to the lithium compound incorporated in the reaction mixture can vary widely. For example, the amounts of these catalyst components used can be such that the atomic ratio of nitrogen to lithium (N:Li) in the catalyst system varies from 0.1:1 to 100:1. A more desirable range of atomic ratios of N:Li within which to operate is from 0.5:1 to 20:1 and it is preferable to employ the amine in at least the stoichiometric amount for forming its coordination complex with the LiR component. For chelating amines of the molecularly rigid sub-type little if any advantage is gained by using more than the stoichiometric amount. However for other types of amines better catalyst activity and longer life often can be obtained by utilizing a substantial excess of the amine relative to the lithium component, for example, 5–10 times the stoichiometric amount required for forming the coordination complex.

In preparing the reaction mixture it is preferable to add the catalyst components separately to the reactor containing the aromatic to be reacted, thus forming the catalyst species in situ, then add ethylene and heat the mixture immediately to a temperature necessary for effecting the telomerization reaction. However, the catalyst can be pre-formed by combining the amine and lithium compound in an inert solvent, such as hexane or decane, and the pre-formed catalyst can then be added to the reactor. In cases where the catalyst is made up in the aromatic hydrocarbon and allowed to stand for a time, there may be a tendency for the catalyst species to precipitate as a sticky oil or solid which may cause mechanical difficulties. This is particularly so when triethylene diamine is used and the N:Li atomic ratio is 1:1 or less. While the precipitated catalyst in such cases is active, it is desirable to avoid such condition and to maintain the catalyst in solution. This can be done by using higher N:Li ratios and by carrying out the reaction with ethylene soon after the aromatic and catalyst components have been added to the reactor.

In carrying out the reaction precautions should be taken to exclude air and moisture from the system to avoid poisoning of the catalyst. Hydrogen also acts as a catalyst poison and hence the ethylene used should not contain free hydrogen.

The temperature for conducting the reaction is in the range of 50–180° C. and more preferably 80–150° C. It is desirable to contact the reactants with the ethylene under substantial pressure in order to accelerate the reaction. Pressures generally in the range of 50–5000 p.s.i.g. can be employed, although lower or higher pressures are operable. The effect of increasing the pressure is to increase the rate of propagation and produce a longer average alkyl chain attached to the aromatic nucleus; hence selection of operating pressure depends upon the product desired. During the reaction the mixture should be agitated vigorously to effect intimate contact between the ethylene and aromatic reactants.

The mechanism of the over-all reaction involves two distinctly different types of reactions, namely, a transmetallation or chain transfer reaction and a chain propagation reaction. The first step in initiating the reaction involves the transfer of a lithium atom from the catalyst complex to the aromatic hydrocarbon and replacement of a hydrogen atom therein by the Li. If the aromatic is one which contains primary or secondary hydrogen at the alpha carbon atom of a side chain, such a hydrogen atom is the one that will be preferentially replaced by Li. Thus toluene will be converted to lithium benzyl. If the aromatic contains no such hydrogen, then a hydrogen atom attached to the aromatic nucleus will be replaced. Thus benzene will convert to lithium phenyl. The next step is the propagation of a chain by the addition of ethylene molecules between the Li atom and the adjacent carbon atom. Finally this telomerization reaction will terminate for any particular molecule undergoing propagation due to transmetallation whereby the Li atom at the end of the chain transfers with a hydrogen atom from another molecule of the aromatic in the same manner as initially occurred. The newly formed lithium aromatic molecule then undergoes the chain growth in a new reaction cycle and the mechanism is repeated. Thus it can be seen that the over-all reaction is truly catalytic, so that the catalyst theoretically would last forever. As a practical matter, the reaction is conducted until a suitable yield of alkyl aromatic product has been obtained, the catalyst is then deactivated in any suitable manner and the reaction mixture is worked up to recover the products and unreacted charge aromatic separately.

As the reaction proceeds the activity of the catalyst tends to decrease and eventually will reach a low enough level that it is no longer feasible to continue the reaction. The catalyst then can be completely deactivated by contacting the mixture with water. This will break the catalyst complex, releasing the amine and converting the lithium into lithium hydroxide. The latter will dissolve in the water phase and can be removed therewith. In cases where a water-soluble amine was used to form the catalyst, the amine will also dissolve in the water phase and can be recovered therefrom by distillation. For higher molecular weight amines which are preferentially soluble in hydrocarbons, the amine can be recovered from the hydrocarbon phase by extraction with aqueous mineral acid and the amine salt can then be decomposed by addition of caustic soda to recover the amine. If desired the catalyst can also be deactivated by substituting alcohol for water.

The length of chain growth and hence the average molecular weight of the alkyl aromatics produced in the process can be controlled by appropriate regulation of the process variables. The average product molecular weight obtained depends upon the rate of the propagation reaction relative to the rate of the transmetallation reaction, since the latter functions to terminate the former. The rate of propagation depends largely on the ethylene pressure employed, while the transmetallation reaction is unaffected by ethylene pressure. Hence the average length of alkyl aromatic side chain can readily be increased by raising the ethylene pressure. On the other hand the rate of transmetallation increases with increasing concentration of the aromatic reactant in the reaction mixture. Thus the average length of the alkyl chain can also be increased by reducing the aromatic concentration, for example, by incorporating in the reaction mixture an inert hydrocarbon such as hexane, cyclohexane, octane or the like. The effect of increasing reaction temperature is to increase the rates of propagation and transmetallation approximately equally, so that the over-all reaction rate is increased without substantial alteration of the average chain length of the product.

From a consideration of the mechanism of the over-all reaction it can be seen that the primary product obtained therefrom consists of alkyl benzenes having a chain which may or may not be branched at the alpha carbon atom depending upon the starting aromatic hydrocarbon used. Thus when the charge aromatic is benzene or a methylated benzene such as toluene, xylene or pseudocumene, no branching appears in the alkyl chain formed in the primary telomerization reaction. On the other hand ethylbenzene forms, as the main primary reaction product, α-methylalkylbenzenes, while n-butylbenzene forms α-propylalkylbenzenes. For any particular reaction there is a variation in the chain length of the alkyl benzenes obtained, so that the product is a mixture of alkylbenzenes having a range of molecular weights. The average molecular weight of the product can be controlled by appropriate adjustment of reaction conditions as discussed above, particularly ethylene pressure and concentration of the starting aromatic.

In addition to the primary reaction product which is a result of chain growth from either an alpha carbon atom or a nuclear carbon atom of the original aromatic hydrocarbon, secondary reaction products are also produced in varying amounts depending upon the degree of conversion effected in the reaction. These are the results of reaction between the ethylene and alkyl benzenes previously formed. This can be illustrated by considering the reactions that can occur using specific starting aromatics.

With benzene as the charge aromatic the primary reaction forms straight chain alkyl benzenes in which the chains are unbranched and contain mainly from 2 up to, for example, 24 carbon atoms. The average molecular weight of this product depends upon the relative rates of the telomerization and transmetallation reactions as previously explained. However, after such alkyl benzenes have been formed, they will compete with the unreacted benzene and thus can themselves become metallated by lithium atoms and undergo further telomerization. Such metallation can occur either at the alpha carbon atom of the alkyl chain or at the meta position on the benzene ring, with the former being the preferred metallation site. This metallation at the alpha carbon atom can result in growth of a chain branching from that position, while metallation at the benzene nucleus can result in the formation of a meta dialkylbenzene in which each alkyl group is unbranched. The chances of metallating primary reaction products instead of the benzene are dictated by statistical considerations and depend upon the relative concentrations of such products on the one hand and benzene on the other in the reaction mixture. Thus the rate of foramtion of secondary reaction products tends to increase as the degree of conversion of the benzene increases. By conducting the reaction to only a low conversion level, products which are preponderantly straight chain mono-alkyl benzenes having an even number of carbon atoms in the chain can be obtained.

When toluene is substituted for benzene, the transmetallation of lithium atoms to the toluene occurs preponderantly at the methyl group and to a small extent at a meta position on the ring. This results in a primary telomerization product which is about 90% straight chain alkyl benzenes in which the chains have odd numbers of carbon atoms and about 10% m-alkyl-toluenes in which the alkyl chains have even numbers of carbon atoms and are unbranched. Secondary reactions can again occur via metallation of the primary reaction products at the alpha carbon of the alkyl chain, at the methyl group of the m-alkyl-toluenes and at a meta position on the nucleus, and the extent to which this takes place will depend upon the degree of conversion reached in the reaction.

In the case of ethylbenzene or higher alkyl benzenes having a methylene group at the alpha position, the tendency to metallate at the benzylic carbon in preference to a meta position on the ring is not as great as in the case of toluene but still is predominant. This results in a primary reaction product which is about 60% 2-phenylalkanes and about 40% m-ethyl-1-phenylalkanes. These primary products can undergo secondary reactions to the extent determined by their concentrations relative to unreacted ethylbenzene in the reaction mixture, thereby resulting in a more complicated mixture of reaction products as the level of conversion of the ethylbenzene increases.

The distribution with respect to molecular weight of the products formed during growth of a chain from a particular site in the aromatic molecule depends upon the rate of the transmetallation reaction relative to the rate of the chain growth. The proportion of realtively low to relatively high molecular weight products increases as the transmetallation rate increases. The molecular weight distribution of products resulting from growth at a particular site can be determined by the following equation:

$$N_n = \frac{\beta}{(1+\beta)^n}$$

wherein $N_n$=the mole fraction of product having $n$ ethylene units in the chain and $\beta$ is determined by the equation $$\beta = \frac{N_n}{N_{n+1}} - 1$$

The value of $\beta$ can be ascertained from experimentally determined mole fractions for any two adjacent products of the chain growth reaction which differ by one ethylene molecule and the entire molecular weight distribution of the growth products can be calculated. The value of $\beta$ for a particular growth reaction depends upon the proton activity of the aromatic reactant. An increase in the transmetallation rate relative to the growth rate coincides with a higher $\beta$ value and a shift of molecular weight distribution toward the lower molecular weight end of the product distribution range. As previously indicated an increase in ethylene pressure speeds upon the growth reaction relative to the transmetallation reaction, and hence such pressure increase results in a decrease in the value of $\beta$. Also the rate of transmetallation decreases if the concentration of the aromatic reactant is decreased as by adding a saturated hydrocarbon solvent to the reaction mixture and the value of $\beta$ will decrease correspondingly.

The value of $\beta$ increases in the following aromatic series in the order named: ethylbenzene<benzene<toluene. Specific $\beta$ values are given for these aromatic hydrocarbons in some of the examples presented hereinafter.

As previously stated a further embodiment of the invention involves the incorporation of an organo-sodium component (NaR′) in the catalyst system. An effect of the addition of NaR′ to the system is to increase the rate of transmetallation without substantially altering the propagation rate and thus to increase the value of $\beta$. The rate of the transmetallation reaction increases as the NaR′:LiR molar ratio increases and the average chain length decreases correspondingly. This molar ratio should not exceed 5:1, as otherwise the propagation reaction becomes dwarfed by the transmetallation reaction and branching in the total product obtained is magnified. Also other alkali metals, such as potassium, cannot be substituted for sodium in this embodiment since the nature of the reaction would be altered and a ring closure reaction forming indanes would result. The latter reaction has been disclosed in my copending application United States Serial No. 169,678, filed January 29, 1962.

The embodiment of the invention utilizing NaR′ as an additional constituent of the catalyst is advantageous where it is desired to produce alkyl benzenes having chains ranging from say 2 to 10 carbon atoms in the case of benzene or 3 to 17 carbon atoms in the case of toluene while minimizing the formation of compounds of longer chain length. In the absence of NaR′, a substantial proportion of the telomers may grow to a higher molecular weight than is desirable before a satisfactory yield of product per weight of catalyst can be obtained. The presence of NaR′ in the system tends to hold down the molecular weight while allowing the use of conditions that provide a feasible over-all reaction rate. Use of the NaR′ constituent is also especially advantageous when the starting aromatic is one (e.g., benzene) which has no hydrogen at an alpha carbon atom, for the reason that transmetallation to a ring carbon instead of an alpha carbon otherwise tends to be slow.

A particularly useful application of the invention is in the preparation of alkyl benzenes for use as intermediates in making detergents of the alkyl benzene sulfonate type. For this purpose it is generally desired that the alkyl groups be in the range of $C_9$–$C_{17}$ and it is preferred that the average number of carbon atoms approximates twelve. Conventionally such alkyl benzenes are made by alkylating benzene with propylene trimers and tetramers produced by phosphoric acid catalyzed polymerization of propylene. Detergents made from these products, however, have a distinct drawback in that they are not readily degradable biologically by the bacterial flora prevalent in disposal systems. This has resulted in a serious foaming problem in many communities. Recently it has been found that the biodegradability of this type of detergent depends upon the structure of the alkyl group attached to the benzene ring (Developments in Industrial Microbiology, vol. 2, pages 93–101, Plenum Press, New York, 1961). Detergents in which the alkyl group is straight chain are completely biodegradable and the presence of one or even two branches on the alpha carbon atom does not substantially lower the degradability. However, the presence of a quaternary carbon atom along the alkyl chain beyond the alpha carbon seems to render the detergent substantially non-degradable biologically. Such quaternary carbon atoms commonly are present in the conventional detergents made from propylene trimers and tetramers. By means of the present process alkyl benzenes having the requisite number of alkyl group carbon atoms and containing no quaternary carbon atom can readily be made. Hence the invention provides an efficacious means of producing detergent stock which will yield detergents that are readily biodegradable in sewage disposal systems.

The following examples illustrate the invention more specifically:

Example I

The reactor used was a 300 ml. rocking-type autoclave containing a batch of steel balls to provide better agitation. The reactor was flushed with an inert gas and then 125 ml. of toluene, 1 g. of n-butyl lithium and 3.4 g. of triethylene diamine were added to it. The atomic ratio of N:Li was approximately 4:1. The autoclave was heated to 105° C. while shaking and ethylene was admitted until the pressure was about 470 p.s.i.g. The pressure was maintained in the neighborhood of 470 p.s.i.g. throughout the reaction by admitting ethylene from time to time as it was consumed. The reaction was allowed to proceed for 3¾ hours. Although at the end of this time the catalyst was still quite active, nevertheless the reaction was stopped since the degree of conversion was sufficient to yield adequate product for determining what reactions had taken place. The reactor was then cooled down and residual gas was vented. Water was added to destroy the catalyst and the mixture was washed with water several times to remove the catalyst residue. Upon removal of unreacted toluene by distillation, 50 g. of alkyl benzene product having an average molecular weight of roughly 300 were obtained. The rate of production of alkyl benzene product amounted to about 13 g. per g. of n-butyl lithium per hour. This product was composed of 35 g. of material distilling below 200° C. at 2 mm. Hg pressure and 15 g. of waxy residue. By infrared spectroscopy the distillate material was shown to be composed preponderantly of mono-substituted 1-phenylalkanes having uneven numbers of carbon atoms in the alkyl chains. Narrow cuts of the distillate were taken under efficient fractionating conditions to isolate fractions having 3, 5, 7, 9 and 11 substituent carbon atoms and these fractions were identified by boiling points and refractive indexes to be, respectively, n-propyl, n-amyl, n-heptyl, n-nonyl and n-hendecyl benzene.

Example II

Four comparative runs were made using the same reactants, catalyst system and procedure described in the preceding example but the average ethylene pressure maintained during the reaction was varied to determine the effect of pressure variation on molecular weight of the alkyl benzenes obtained. Also in one run the temperature employed was 125° C. instead of 105° C. The weight percent yields of products in which the number of substituent carbon atoms were in the ranges of $C_3$–$C_7$, $C_9$–$C_{17}$ and $C_{19+}$ are shown in the following table.

| Reaction temp., °C. | Average pressure, p.s.i.g. | Yield, wt. percent | | |
|---|---|---|---|---|
| | | $C_3$–$C_7$ | $C_9$–$C_{17}$ | $C_{19+}$ (wax) |
| 105 | 400 | 38 | 38 | 24 |
| 105 | 500 | 28 | 36 | 36 |
| 105 | 800 | 22 | 23 | 55 |
| 125 | 800 | 28 | 27 | 45 |

The tabulated data show that the effect of increasing the ethylene pressure is to shift the molecular weight of the alkyl benzene product upwardly or in other words to increase the length of the side chain attached to the aromatic nucleus. This results from an increase in rate of the propagation reaction relative to the rate of transmetallation. The products designated as having from $C_9$ to $C_{17}$ substituent carbons constitute the fraction which is particularly useful as detergent intermediates. The lower molecular weight fraction ($C_3$–$C_7$) can be recycled in the process to increase the yield of the $C_9$–$C_{17}$ fraction if desired. The fraction of highest molecular weight can be cracked under appropriate conditions to yield alkyl and alkenyl benzenes having less carbon atoms in the substituent chain and a terminal double bond in the alkenyl compounds. This highest boiling fraction is composed of wax-like compounds some of which have higher melting points than any naturally occurring petroleum waxes. The fraction can be separated by fractional crystallization into waxes of varying properties having utility in special applications.

*Example III*

Three comparative runs were made with toluene as the starting aromatic and using different amines as a constituent of the catalyst. The three amines were triethylene diamine, triethylamine, and trimethylamine, and each was used in amount such that the molar ratio of amine to n-butyl lithium was 2:1. The conditions otherwise were essentially the same as described in Example I except that the pressure was maintained at about 500 p.s.i.g. During the reaction ethylene was intermittently added to the reactor in a manner such that the pressure oscillated between a high of about 520 p.s.i.g. and a low of about 480 p.s.i.g. The pressure drops that occurred during the reaction were taken additively as a measure of the ethylene consumed and can be used as an indicium of the rate of reaction and accordingly the catalytic activity during any given time interval. The following tabulation, in which the additive pressure drop per hour per gram of n-butyl lithium is taken as the measure of reaction rate, indicates the effect of reaction time on activity of the catalysts prepared from the three specified amines.

| Reaction time, hrs | Initial | 0.5 | 1 | 2 | 3 | 4 |
|---|---|---|---|---|---|---|
| Reaction rates: | | | | | | |
| Triethylene diamine | 390 | 320 | 300 | 300 | 300 | 300 |
| Triethylamine | 370 | 220 | 100 | 10 | 0 | 0 |
| Trimethylamine | 300 | 210 | 150 | 90 | 60 | 40 |

These data show that each of the three catalysts had high activity initially. With triethylene diamine the activity dropped a minor amount in the early part of the run but then stabilized at a high level and no indication of loss of activity thereafter was observed. On the other hand the catalysts made with each of the trialkylmonoamines showed a continued loss of activity after the initial stage of reaction. The one containing triethylamine became completely inactive after a reaction time of two hours. These data show that all of these tertiary amines are operative for practicing the invention but that the triethylene diamine is distinctly preferred.

*Example IV*

A series of runs was made in which an organo-sodium compound, specifically sodium benzyl, was incorporated in the catalyst as a third component in varying proportions of sodium benzyl to n-butyl lithium. The aromatic reactant was toluene, the amine was triethylene diamine, the temperature was 105° C. and the average ethylene pressure was about 500 p.s.i.g. in all the runs. For all runs the amount of amine used was such that the atomic proportion of nitrogen to total alkali metal (Li plus Na) was 2:1, and the amount of n-butyl lithium was one gram. In the runs the reaction was carried out for about 1–2 hours by the same procedure as in Example I. After reaction the alkyl benzene products in which the side chain varied from $C_3$ through $C_{11}$ was separated and the weight percent of n-propylbenzene in this fraction was determined. The following tabulation shows the percent of n-propylbenzene found for various lithium to sodium atomic ratios in the catalyst.

| Li:Na Atomic ratio | Weight percent of n-propylbenzene |
|---|---|
| 100:0 | 26 |
| 90:10 | 30 |
| 80:20 | 32 |
| 65:35 | 36 |
| 50:50 | 42 |

From the data it can be seen that the effect of increasing the amount of the organo-sodium compound in the catalyst system is to increase the amount of lower molecular weight alkyl benzene in the product. This effect is a result of an increase in rate of the transmetallation reaction relative to the propagation rate. Hence, when the desired products of the process are lower molecular weight alkyl benzenes, it is beneficial to incorporate an organo-sodium compound in the catalyst system.

*Example V*

A run was made in the same manner as Example I except that benzene was substituted for toluene and the pressure was maintained at about 500 p.s.i.g. The reaction occurred at a rate that was approximately one-half the rate with toluene. The product from the reaction in this case was preponderantly straight chain alkyl benzenes having an even instead of odd number of carbon atoms in the alkyl groups. The product was composed of 40% by weight alkyl benzenes in which the alkyl groups were of the $C_2$–$C_{18}$ range and 60% by weight of higher molecular weight waxy material.

*Example VI*

This example illustrates the use of a chelating diamine of the flexible sub-type, namely, N,N'-tetramethyl-ethylenediamine, in the telomerization of ethylene with benzene. The reactor used was a 300 ml. rocking-type autoclave containing a batch of steel balls to provide better agitation. The reactor was flushed with an inert gas and was charged with 150 ml. of anhydrous benzene, 0.32 g. (0.005 mole) of n-butyl lithium and 0.56 g. (0.005 mole) of the diamine. The atomic ratio of N:Li was 2:1. The autoclave was rapidly heated at 110° C. while shaking, and during the latter part of the heating period ethylene was admitted until the pressure was about 500 p.s.i.g. The pressure was maintained at 500 p.s.i.g. throughout the reaction by feeding in ethylene through a pressure regulating valve as the ethylene was consumed. After starting the reaction the rate of ethylene consumption initially declined and then became fairly constant. The reaction was allowed to proceed for 30 minutes during which time 25 g. of ethylene reacted. Although at the end of this time the catalyst still had high activity, the reaction was stopped. The reactor was cooled down and residual gas was vented. Isopropanol was added to destroy the catalyst. The hydrocarbon phase was then successively washed with aqueous HCl and with water and the unreacted benzene was distilled from the mixture. The total telomerization product amounting to 40 g. was obtained as a partially waxy residue. This product was separated into fractions in a 30 plate distillation column. The individual product fractions were identified from their boiling points and infrared spectra as mainly constituting a homologous series of 1-phenyl-alkanes in which the alkyl chains had even numbers of carbon atoms. By vapor phase chromatography mole fractions for successive 1-phenylalkanes in the product were determined from which the value of $\beta$ was calculated to be 0.33. The product distribution of the 1-phenylalkanes is illustrated by the following tabulation wherein the mole and weight percents for several selected product molecular weights are shown.

| No. of ethylene units | No. of total carbon atoms | Percent in product | |
|---|---|---|---|
| | | Mole | Weight |
| 1 | 8 | 24.8 | 13.2 |
| 2 | 10 | 18.6 | 13.0 |
| 4 | 14 | 10.5 | 10.2 |
| 8 | 22 | 3.2 | 5.1 |
| 16 | 38 | 0.3 | 0.8 |

*Example VII*

This example was carried out in the same manner as Example VI using the same catalyst and reaction conditions except that ethylbenzene was substituted for benzene as the starting aromatic. In the reaction ethylene was consumed rapidly at the beginning and its rate of consumption decreased considerably during the reaction which was allowed to proceed for one hour. The total amount of ethylene reacted during this time was about 40 g. A waxy telomer product was obtained upon working up the reaction mixture. Analysis showed that the product was composed mainly of two types of alkyl benzenes each constituting a homologus series. One type consisted of 2-phenylalkanes and the other 1-(3-ethylphenyl) alkanes and these occured in a proportion of about 60:40. The 2-phenylalkanes resulted from metallation at the secondary benzylic carbon while the other type derived from a concurrent metallation at a meta position of the aromatic nucleus. Separation of the different type compounds was accomplished by vapor phase chromatography and the individual compounds were identified by the infrared and nuclear magnetic resonance spectroscopy. The value for $\beta$ in the reaction was found to be 0.29.

*Example VIII*

Another run was made in the manner of Example VI except that toluene was substituted for benzene and a rigid chelating type of amine, namely, the alkaloid sparteine ($C_{15}H_{26}N_2$), was used in preparing the catalyst. The catalyst system was prepared using 0.1 g. of butyl lithium and 0.8 g. of sparteine. The reaction was conducted at 125° C. and a constant ethylene pressure of 500 p.s.i.g. for a time of 2 hours during which about 20 g. of ethylene reacted. The total telomerization product amounted to 30 g. Analysis showed that it was composed of about 90% of a homologous series of 1-phenylalkanes having uneven numbers of carbon atoms in the chains and 10% of 1-(3-methylphenyl)alkanes having even numbers of carbon atoms in the chains. The value of $\beta$ for the reaction was found to be 0.55. The following tabulation illustrates the molecular weight distribution of products for this reaction:

| No. of ethylene units | No. of total carbon atoms | Percent in product | |
|---|---|---|---|
| | | Mole | Weight |
| 1 | 9 | 35.4 | 23.2 |
| 2 | 11 | 22.8 | 19.0 |
| 4 | 15 | 9.5 | 11.2 |
| 8 | 23 | 1.6 | 3.0 |
| 16 | 39 | 0.05 | 0.2 |

When other aromatics are substituted for those used in the preceding examples, analogous reactions will occur and the position from which the alkyl chain grows to form the major reaction product will depend upon the presence or absence in the molecule of an alpha carbon carrying a hydrogen atom. For example, with n-propylbenzene the predominant product will be 3-phenylalkanes. On the other hand, when the starting aromatic is t-butyl-benzene, the product is mainly composed of 1-(3-t-butyl-phenyl)alkane. Also when other hydrocarbo-lithium compounds as herein defined are substituted for butyl lithium, substantially similar results are obtained. When other amines as herein defined are substituted for the amines used in the preceding examples, analogous reactions are obtained although, as previously discussed, the efficacy of the catalyst system formed can vary considerably depending upon the particular type of amine selected.

The high molecular weight waxy materials that are obtainable by the present invention can be used as waxes for various industrial applications or as additives for other waxes. They can also be sulfonated at the aromatic nucleus to produce oil-soluble sulfonate type detergents for special applications. Also, as previously mentioned, they can be cracked under suitable conditions to produce phenylalkenes and phenylalkanes.

I claim:

1. Method of producing alkyl aromatic hydrocarbons which comprises contacting ethylene with a benzenoid hydrocarbon at a temperature in the range of 50–180° C. in the presence of a catalyst system which is a combination of non-aromatic tertiary amine with LiR wherein R is a hydrocarbon radical having 1–30 carbon atoms selected from the group consisting or alkyl, cycloalkyl, alkenyl, phenyl, alkylphenyl and phenylalkyl.

2. Method according to claim 1 wherein said temperature is in the range of 80–150° C. and the ethylene is contacted at a pressure of at least 50 p.s.i.g.

3. Method according to claim 1 wherein said amine is a chelating diamine.

4. Method according to claim 3 wherein said temperature is in the range of 80–150° C. and the ethylene is contacted at a pressure of at least 50 p.s.i.g.

5. Method according to claim 1 wherein said amine contains bridgehead nitrogen.

6. Method according to claim 5 wherein said temperature is in the range of 80–150° C. and the ethylene is contacted at a pressure of at least 50 p.s.i.g.

7. Method according to clain 6 wherein said amine is triethylene diamine.

8. Method according to claim 1 wherein R is an alkyl radical.

9. Method according to claim 1 wherein said benzenoid hydrocarbon is selected from the group consisting of benzene, monoalkylbenzenes and dialkylbenzenes.

10. Method of producing alkyl aromatic hydrocarbons which comprises contacting ethylene at a pressure in the range of 50–5000 p.s.i.g. and at a temperature in the range of 80–150° C. with a benzenoid hydrocarbon selected from the group consisting of benzene, monoalkyl-benzenes and dialkylbenzenes in the presence of a catalyst which is a combination of non-aromatic tertiary amine with LiR wherein R is a hydrocarbon radical having 1–30 carbon atoms selected from the group consisting of alkyl, cycloalkyl, alkenyl, phenyl, alkylphenyl and phenylalkyl, the proportion of said amine to LiR being such that the atomic ration of N:Li is at least 0.5:1.

11. Method according to claim 10 wherein said amine is a chelating diamine.

12. Method according to claim 11 wherein said amine is N,N'-tetramethylethylene diamine.

13. Method according to claim 11 wherein said amine is sparteine.

14. Method according to claim 11 wherein said amine is N,N'-tetraalkyl-1,2-diaminocyclohexane.

15. Method according to claim 11 wherein said amine is N,N'-dialkylbispidin.

16. Method according to claim 10 wherein said amine contains bridgehead nitrogen.

17. Method according to claim 16 wherein said amine is triethylene diamine.

18. Method of producing alkyl aromatic hydrocarbons which comprises contacting ethylene with a benzenoid hydrocarbon at a temperature in the range of 50–180° C. in the presence of a catalyst system which is a combination of non-aromatic tertiary amine with LiR and NaR' wherein R and R' are hydrocarbon radicals having 1–30 carbon atoms selected from the group consisting of alkyl, cycloalkyl, alkenyl, phenyl, alkylphenyl and phenylalkyl, the molar ratio of NaR' to LiR being in the range of 0.01:1 to 5:1.

19. Method according to claim 18 wherein the temperature is in the range of 80–150° C. and the amounts of catalyst components are such that the N:(Li+Na) atomic ratio is at least 1:1.

20. A catalyst system consisting essentially of a combination of non-aromatic tertiary amine, selected from the group consisting of amines containing bridgehead nitrogen and chelating diamines, with LiR wherein R is a hydrocarbon radical having 1–30 carbon atoms selected from the group consisting of alkyl, cycloalkyl, alkenyl, phenyl, alkylphenyl and phenylalkyl.

21. A catalyst system according to claim 20 wherein said amine is triethylene diamine.

22. A catalyst system according to claim 20 wherein said amine is N,N'-tetramethylethylene diamine.

23. A catalyst system according to claim 20 wherein said amine is sparteine.

24. A catalyst system according to claim 20 wherein said amine is N,N'-tetraalkyl-1,2-diaminocyclohexane.

25. A catalyst system according to claim 20 wherein said amine is N,N'-dialkylbispidin.

26. A catalyst system consisting essentially of a combination of non-aromatic tertiary amine, selected from the group consisting of amines containing bridgehead nitrogen and chelating diamines, with LiR and NaR' wherein R and R' are hydrocarbon radicals having 1–30 carbon atoms selected from the group consisting of alkyl, cycloalkyl, alkenyl, phenyl, alkylphenyl and phenylalkyl, the molor ratio of NaR' to LiR being in the range of 0:01:1 to 5:1.

27. A catalyst system according to claim 26 wherein said amine is N,N'-tetramethylethylene diamine.

28. A catalyst system according to claim 26 wherein said amine is sparteine.

29. A catalyst system according to claim 26 wherein said amine is triethylene diamine.

References Cited by the Examiner

UNITED STATES PATENTS

| | | | |
|---|---|---|---|
| 2,119,493 | 5/38 | Scott | 260—665 |
| 2,728,802 | 12/55 | Closson et al. | 260—668 |
| 3,090,819 | 5/63 | Foster | 260—665 |

References Cited by the Applicant

"Chemistry of the Metal Chelate Compounds" (1952), by Martell and Calvin, pages 134–137.

DELBERT E. GANTZ, *Primary Examiner.*

ALPHONSO D. SULLIVAN, *Examiner.*

Notice of Adverse Decision in Interference

In Interference No. 95,829 involving Patent No. 3,206,519, G. G. Eberhardt, PREPARATION OF ALKYL AROMATIC HYDROCARBONS, final judgment adverse to the patentee was rendered June 19, 1968, as to claims 20, 22 and 24.

[*Official Gazette August 20, 1968.*]